(12) United States Patent
Wolrich et al.

(10) Patent No.: US 6,463,072 B1
(45) Date of Patent: Oct. 8, 2002

(54) METHOD AND APPARATUS FOR SHARING ACCESS TO A BUS

(75) Inventors: Gilbert Wolrich, Framingham; Debra Bernstein, Sudbury; Matthew Adiletta, Worcester, all of MA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/473,570

(22) Filed: Dec. 28, 1999

(51) Int. Cl.⁷ ................................................ H04L 12/40
(52) U.S. Cl. ...................................... 370/439; 714/400
(58) Field of Search ........................ 370/458, 438–442, 370/503, 327; 422/427; 229/230; 282/352; 390/395; 331/462–468, 402–410; 338/474, 255, 412; 709/248–256, 231, 321, 228–230; 710/22, 52, 8–10, 202, 107–113, 102; 714/4, 33–34; 713/400; 345/522; 712/28

(56) References Cited

U.S. PATENT DOCUMENTS

| | | | | |
|---|---|---|---|---|
| 5,452,437 A | * | 9/1995 | Richey et al. ................. | 714/4 |
| 5,613,136 A | * | 3/1997 | Casavant et al. ............. | 712/28 |
| 5,784,649 A | * | 7/1998 | Begur et al. .................. | 710/52 |
| 5,796,413 A | * | 8/1998 | Shipp et al. ................. | 345/522 |
| 5,886,992 A | * | 3/1999 | Raatikaien et al. ......... | 370/439 |
| 6,072,781 A | * | 6/2000 | Feeney et al. ............. | 370/282 |
| 6,141,765 A | * | 10/2000 | Sherman ..................... | 713/400 |
| 6,199,133 B1 | * | 3/2001 | Schnell ....................... | 710/110 |
| 6,298,370 B1 | * | 10/2001 | Tang et al. ................. | 709/102 |

* cited by examiner

*Primary Examiner*—Kwang Bin Yao
*Assistant Examiner*—Pernell Jones
(74) *Attorney, Agent, or Firm*—Fish & Richardson P.C.

(57) ABSTRACT

A router includes a communications bus, a second bus, and at least two processors. The second bus transfers ready status data from ports connected to the communications bus. The processors are connected to the communications and second busses. One of the processors controls the communications bus at each time. Each processor transfers control of the communications bus to another processor in response to receiving a request for control from the other processor.

17 Claims, 10 Drawing Sheets

METHOD AND APPARATUS FOR SHARING ACCESS TO A BUS

BACKGROUND OF THE INVENTION

This invention relates to data processors and busses.

Some modern processors use a parallel array of identical processors to perform tasks on incoming instructions and/or data. The parallel array can handle high instruction and/or data bandwidths if the various tasks are independent. Prior art routers have relied heavily on application specific integrated circuits (ASICs) to perform routing functions. Each ASIC is configured for a particular system. Different systems and/or communication protocols generally use different ASICs.

SUMMARY OF THE INVENTION

According to one aspect of the invention, a router includes a communications bus, a second bus, and at least two processors. The second bus transfers ready status data from ports connected to the communications bus. The processors are connected to the communications and second busses. One of the processors controls the communications bus at each time. Each processor transfers control of the communications bus to another processor in response to receiving a request for control from the other processor.

DESCRIPTION

Figure 1:
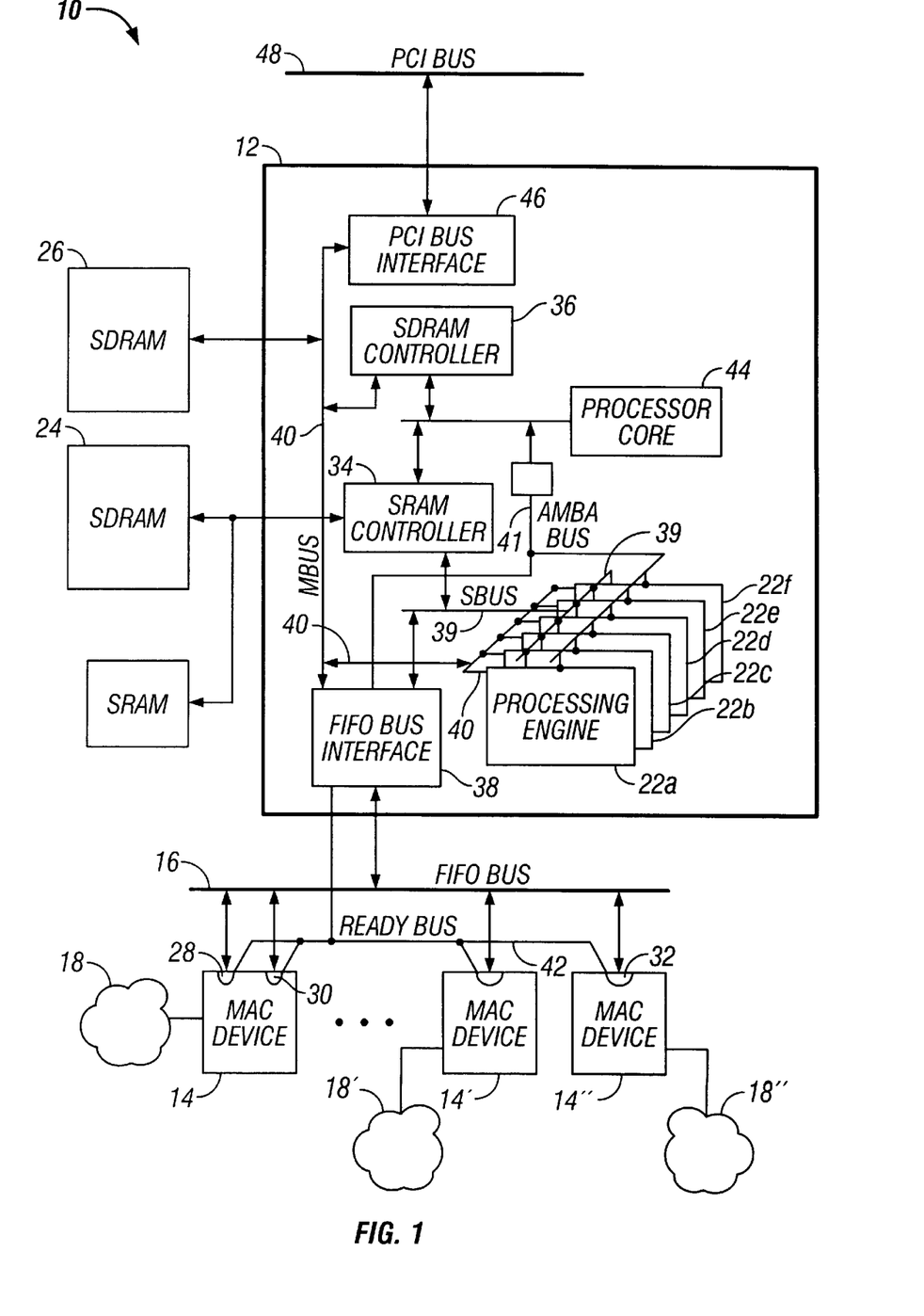
FIG. 1 is a block diagram of a router based on a multi-threaded processor.

FIG. 1 is a block diagram of a router 10 that uses a parallel processor 12, a set of media access chip (MAC) devices 14, 14', 14", and a FIFO bus 16. The router 10 performs data switching between source and destination networks 18, 18', 18" connected to the MAC devices 14, 14', 14". The MAC devices 14, 14', 14" are bridges that couple external networks 18, 18', 18" to the FIFO bus 16. The FIFO bus 16 transports packets having both data portions and headers carrying address information, i.e., FIFO bus 16 is a communications bus. The processor 12 can execute software to control data routing. By basing control on software, the processor 12 may be more easily modified to accommodate new protocols or data characteristics.

The router 10 performs data routing in two stages. First, one of the MAC devices 14, 14', 14" connected to the source network 18, 18', 18" transmits a data packet to the parallel processor 12 via the FIFO bus 16. Second, the parallel processor 12 retransmits the data packet over the FIFO bus 18 to the MAC device 14, 14', 14" connected to the destination network 18, 18', 18". The data transmissions over the FIFO bus 16 employ 64-byte data packets and proceed via an Ethernet protocol.

The parallel processor 12 has a parallel data forwarding structure that includes an array of identical processing engines 22a–22f. Each processing engine 22a–22f has an internal structure for executing a plurality of, e.g., four, independent threads.

Figure 2:
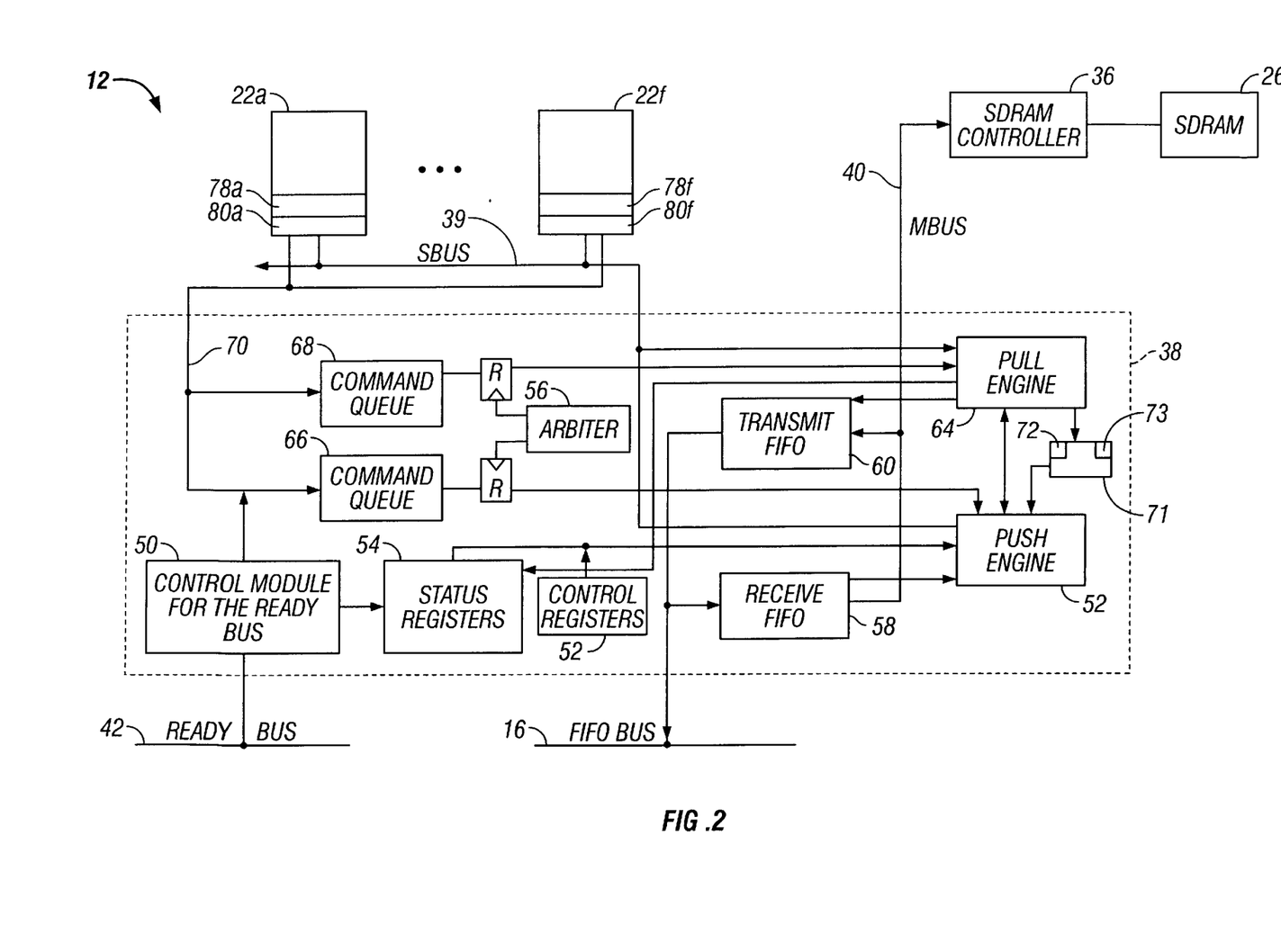
FIG. 2 is a block diagram of a FIFO bus interface of the parallel processor of FIG. 1.

Referring to FIGS. 1 and 2, the processing engines 22a–22f process data packets received from the MAC devices 14, 14', 14". To process a data packet, one of the processing engines 22a14 22f looks up routing information in a synchronous random-access memory (SRAM) 24 using information from the packet header. The processing engines 22a–22f also move the data packets from a FIFO buffer 58 to a queue in a synchronous dynamic random-access memory (SDRAM) 26. The FIFO buffer 58 temporarily stores data packets received from the MAC devices 14, 14', 14". The various queues located in the SDRAM 26 are classified by destination MAC device 14, 14', 14" and retransmission priority.

The processing engines 22a–22f also process data from the queues of the SDRAM 26. This processing includes moving data packets from the queues of the SDRAM 26 to a FIFO buffer 60. The FIFO buffer 60 temporarily stores data prior to retransmission to the MAC devices 14, 14', 141" over the FIFO bus 16. Along with the data, associated control and destination information are stored in the FIFO buffer 60 for use in transmitting the data. The associated data is 16 bytes wide.

The SRAM 24 and SDRAM 26 couple to the processing engines 22a–22f through respective SRAM and SDRAM controllers 34, 36. The SRAM controller 34 has content addressable memory that supports look ups of identification information on the queues of the SDRAM 24. The look-ups use header data from received data packets. The SDRAM controller 36 coordinates data writes to and reads from the queues of the SDRAM 24 that store received data packets.

The parallel processor 12 has several internal busses 39, 40, 41. An S bus 39 couples the processing engines 22a–22f to a FIFO bus interface 38 (FBI) and to the SRAM controller 34. An M bus 40 couples the processing engines 22a–22f and the FBI 38 to the SDRAM controller 36 and the SDRAM 26. An AMBA bus 41 couples a processor core 44 to the processing engines 22a–22f and the FBI 38.

The FBI 38 controls data transfers on the FIFO bus 16 and collects status data on the readiness of the ports 28, 30, 32 of the MAC devices 14, 14', 14" to participate in data transfers over the FIFO bus 16. The ready status data is collected from the MAC devices 14, 14', 14" through a ready bus 42, which is also controlled by the FBI 38.

Referring again to FIG. 1, the processor core 44 uses software to perform a variety of functions. The functions may include data packet routing, exception handling, queue management, monitoring of data packet transfers, supporting network management protocols and/or providing local area network emulation.

The parallel processor 12 includes a PCI bus interface 46 that couples to a PCI bus 48. The PCI bus 48 can support communications between the parallel processor 12 and external processors. The other processors may control and/or reprogram the processor core 44 or other components 22a–22f, 38 of the multiprocessor 12.

Referring again to FIG. 2, the connections between the FBI 38 and the processing engines 22a–22f are shown. The FBI 38 includes a control module 50 for the ready bus 42 and a push engine 62. The control module 50 periodically collects receive-ready status data and transmit-ready status data from the MAC devices 14, 14', 14". The collected ready status data is stored in a set of status registers 54. The set includes separate registers for storing receive-ready status data and transmit-ready status data. The push engine 62 regularly sends the ready status data over the S bus 39 to scheduler threads located in the processing engines 22a–22f in response to commands from logic internal to the FBI 38.

The processing engines 22a–22f include separate receive-scheduler and transmit-scheduler threads. The receive-scheduler thread schedules the processing of data received from the FIFO bus 16. The transmit-scheduler thread schedules the processing of data to be transmitted to the FIFO bus 16.

The receive-scheduler thread assigns data forwarding and header processing tasks to other threads in the processing engines 22a–22f. These tasks include sharing operation of a push engine 62 that transports data from the receive FIFO buffer 58 in the FBI 38 to one of the storage queues in the SDRAM 26.

The transmit-scheduler thread also assigns data forwarding tasks to other threads in the processing engines 22a–22f. These tasks include sharing in operation of a pull engine 64, which moves data from the storage queues in the SDRAM 26 to the transmit FIFO buffer 60. The tasks also include directing the pull engine 62 to write transmission control and MAC device 14, 14', 14" address information to the FIFO buffer 60. Each data packet in the transmit FIFO buffer 60 has associated address and control information that control the retransmission over the FIFO bus 16.

To control data forwarding by the push and pull engines 62, 64, the execution threads of the processing engines 22a–22f send commands signals to FIFO command queues 66, 68 via a line 70. Components of the FBI 38 can also send commands to the command queues 66, 68 of push and pull engines 62, 64. For example, the ready bus controller 50 can send a command to the queue 66 that causes the push engine 62 to transfer ready status data from the status registers 54 to the processing engines 22a–22f. An arbiter 56 controls transmission of commands from the queues 66, 68 to the push and pull engines 62, 64.

The push and pull engines 62, 64 perform several types of tasks. The push and the pull engines 62, 64 are involved in bi-directional forwarding of data packets between the FIFO buffers 58, 60 and the SDRAM controller 36. The push and pull engines 62, 64 also operate a large hardware unit 71 located in the FBI 38. The push engine 62 also forwards ready status data from the set of status registers 54 to the receive- and transmit-scheduler threads located in the processing engines 22a–22f.

The hardware unit 71 performs various operations for the execution threads of the processing engines 22a–22f and includes a hash unit 72 and a scratchpad memory 73. The execution threads operate the hardware unit 71 by sending commands to the queues 66, 68. To perform the operations, the pull engine 64 retrieves input data over the S bus 39 from output transfer registers 80a–80f of the requesting processing engine 22a–22f. The pull engine 64 moves the retrieved data and associated commands to the hardware unit 71. The hardware unit 71 forwards results from the operations to the push engine 62. The push engine 62 uses command information from the command queue 66 and/or pull engine 64 to transmit the results back over the S bus 39 to input transfer registers 78a–78f of the requesting or destination processing engine 22a–22f.

Figure 3:
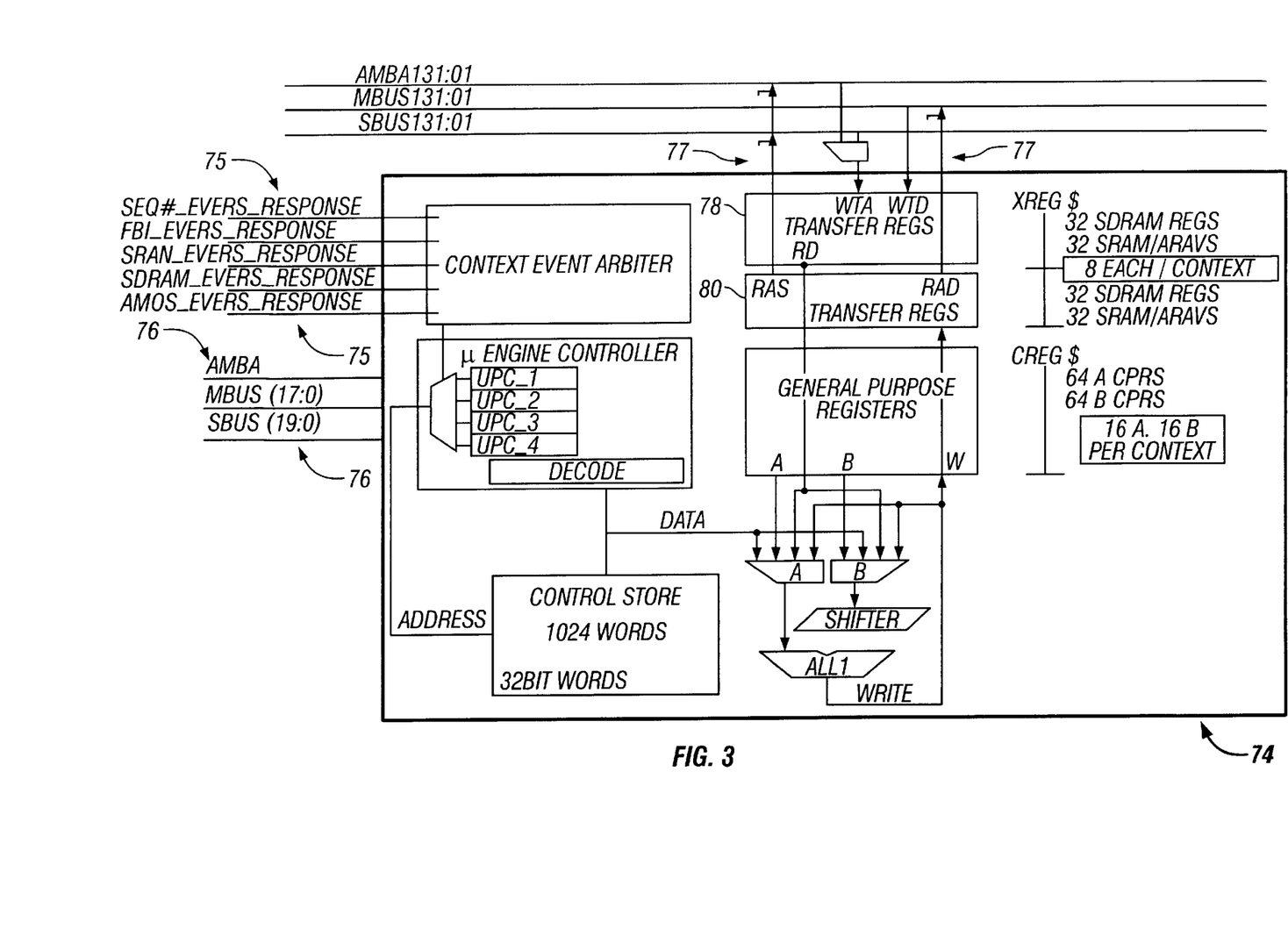
FIG. 3 is a block diagram of one of the parallel processing engines used by the multithreaded processor of FIG. 1.

Referring to FIG. 3, one embodiment 74 of the processing engines 22a–22f is shown. The processing engines 22a–22f have input/output terminals 75–77 for control signals, address signals, and data. Control signals, address signals, and data are transferred to and from the processing engines 22a–22f over three busses, i.e., the M bus 40, the S bus 39, and the AMBA bus 41. The address signals identify both a processing engine 22a–22f and an execution thread so that external commands can independently address different threads. Data is received at and transmitted from respective input and output transfer registers 78, 80. Each input or output transfer register 78, 80 is assigned to an individual execution thread. To write data to or read data from a particular execution thread, an external device accesses one of the transfer registers 78, 80 assigned to the particular thread.

Figure 4:
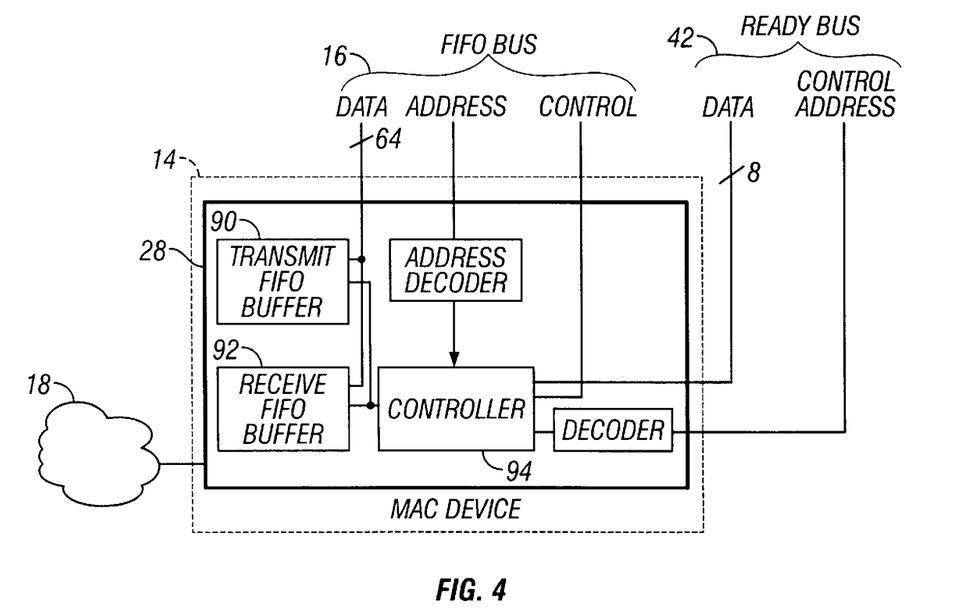
FIG. 4 is a block diagram of a MAC port coupled to the multithreaded processor of FIG. 1.

Referring to FIG. 4, the port 28 of the MAC device 14 is shown. The port 28 has transmit and receive FIFO buffers 90, 92 for storing data prior to transmission to and after reception from the FIFO bus 16, respectively. Both buffers 90, 92 have entries of fixed size that are multiples of 64 bytes, i.e., the size of data packets on the FIFO bus 16. The port 28 also includes address decoders and a controller 94. The controller 94 controls both protocol transfers over the FIFO bus 16 and responses to ready status queries from the ready bus 42. The responses to the queries indicate whether the transmit buffer 90 has a 64 byte data packet to transmit and/or whether the receive buffer 92 has space to receive a 64 byte data packet.

The various ports 28, 30, 32 of the MAC devices 14, 14', 14" may support different data transfer rates. The ports 28, 30 of the MAC devices 14, 14' support transfer rates of about ten or one hundred megabits of data per second. The port 32 of the MAC device 14" may have a transfer rate of up to about one gigabit per second.

The ready bus 42 includes control/address and data lines. The control/address lines enable selection of a transaction type and a port 28, 30, 32 of the MAC devices 14, 14', 14". The data line transfers receive- and transmit-ready status data to the FBI 38 in response to status queries from the control module 50 for the ready bus 42.

Figure 5A:
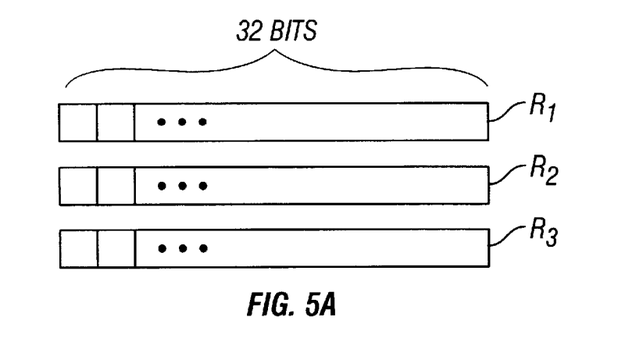
FIG. 5A shows the status registers for receive-status data.

Referring to 5A, the registers $R_1$, $R_2$, $R_3$ that store receive-ready status data are shown. The registers $R_1$ and $R_2$ store receive-ready status data for individual MAC ports 28, 30, 32. The readiness of each MAC port 28, 30, 32 to transmit a data packet to the FIFO bus 16 is indicated by the value of an associated bit or flag stored in one of the registers $R_1$, $R_2$. One logic value of the bit or flag indicates that the associated port 28, 30, 32 has a data packet ready to transmit, and the other logic value indicates the associated port 28, 30, 323 has no ready data packets. Different ports 28, 30, 32 may have data packets of different sizes, but the receive scheduler thread knows the packet size associated with each port 28, 30, 32.

The registers $R_2$ and $R_3$ have 32 bits each and thus, can accommodate receive-ready status data for up to 64 different MAC ports 28, 30, 32.

The register $R_3$ stores a cyclic counter value, which acts as a time stamp for the receive-status data stored in registers $R_1$, $R_2$. The counter value is incremented each time new receive-status data is collected. By comparing the counter value to a previously received counter value, the scheduler thread can determine whether the present receive-status data is new or stale, i.e., whether the data has already been seen.

Figure 5B:
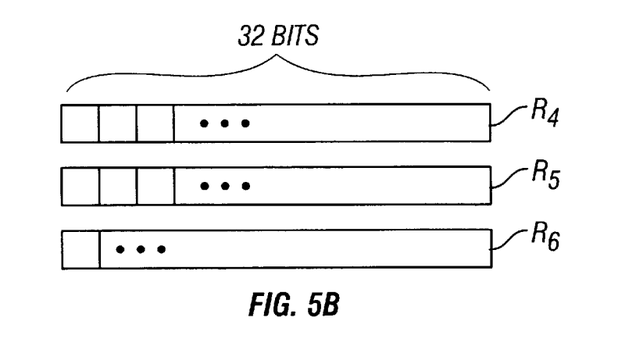
FIG. 5B shows the status registers for transmit-status data.

Referring to FIG. 5B, the registers $R_4$, $R_5$, $R_6$ that store transmit-ready status data are shown. The registers $R_4$, and $R_4$ store transmit-ready status data for individual MAC ports 28, 30, 32. Each MAC port 28, 30, 32 has an associated bit or flag in one of the registers $R_4$, and $R_4$. One logic value of the bit or flag indicates that the associated port 28, 30, 32 has enough space to receive a data packet, and the other logic value indicates the associated port 28, 30, 32 does not have enough space.

The registers $R_4$, and $R_5$ have a total of 64 bits and thus, can report transmit ready status for up to 64 MAC ports 28, 30, 32.

Figure 5C:
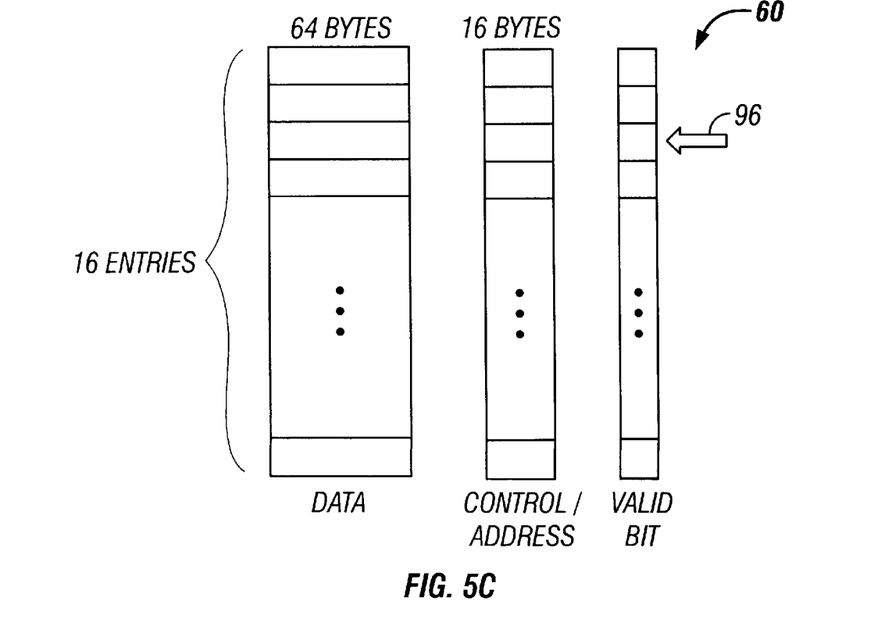
FIG. 5C shows the transmit FIFO buffer located in the FIFO bus interface of FIG. 2.

Referring to FIG. 5C, the number stored in register $R_6$ indicates the position of a remove pointer 96 in the transmit FIFO buffer 60. For an embodiment in which the transmit FIFO buffer 60 has sixteen entries, the position of the remove pointer is represented as a 4-bit number.

Since the FBI 38 transmits 64-byte data packets from the buffer 60 according to a FIFO scheme, the remove pointer 96 indicates which data packets are scheduled but not transmitted. The position of the pointer 96 can be used to determine which MAC ports 28, 30, 32 have been scheduled to receive a data packet but have not yet received a data packet. Such ports 28, 30, 32 may have status data in registers $R_4$, $R_5$ indicating an availability to receive a data packet even though the available space has already been assigned to a waiting data packet.

The transmit scheduler thread can use the position of the remove pointer 96 to interpret transmit-ready status data of the registers $R_4$, $R_5$. From the position of the remove pointer 96, the transmit scheduler thread identifies MAC ports 28, 30, 32 already scheduled to receive a data packet. The transmit scheduler thread does not schedule a new data packet for such ports, because the already scheduled data packet may take the available space therein.

In the parallel processor 12, the collection of ready status data is asynchronous with respect to scheduling of data packet transfers. The asynchronous relationship enables both the collection of ready status data and the scheduling of data packets to have higher effective bandwidths. The asynchronous relationship also introduces some unpredictability into latencies associated with the transfer of newly collected ready status data to scheduler threads.

Figure 6A:
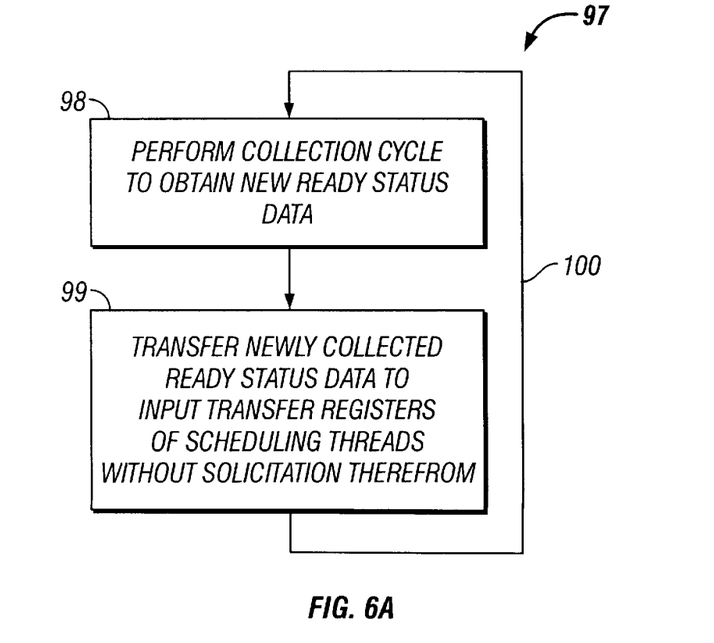
FIG. 6A is a flow chart showing a process for providing ready-status data to scheduler threads.

Referring to FIG. 6A, a process 97 by which the FBI 38 provides ready status data to the scheduler threads is shown. The FBI 38 performs 98 a collection cycle in which new ready status data is obtained from the MAC devices 14, 14', 14" interactively via the ready bus 42. In response to completing the collection cycle, the FBI 38 performs an unsolicited transfer 99 of the newly collected ready status data to the input transfer registers 78a–78f assigned to the scheduler threads. In an unsolicited data transfer, the destination device for the transfer does not request the transfer. The transfer of ready status data from the FBI 38 to destination processing engines 22a–22f and scheduling threads proceeds without any request from the processing engines 22a–22f. Instead, the FBI 38 automatically performs the transfer in response to finishing a collection cycle for the ready status data. The completion of each collection cycle causes issuance of a command to the push engine 62, which transfers the ready bus data to the processing engines 22a–22f. After completing the transfer, the FBI 38 loops back 100 to collect new ready status data.

Making transfers of new ready status data unsolicited lowers latencies for delivering such data to scheduler threads. Since latencies in delivering such data can cause scheduling errors, making the transfer of ready status data unsolicited can lower numbers of occurrences of scheduling errors.

Figure 6B:
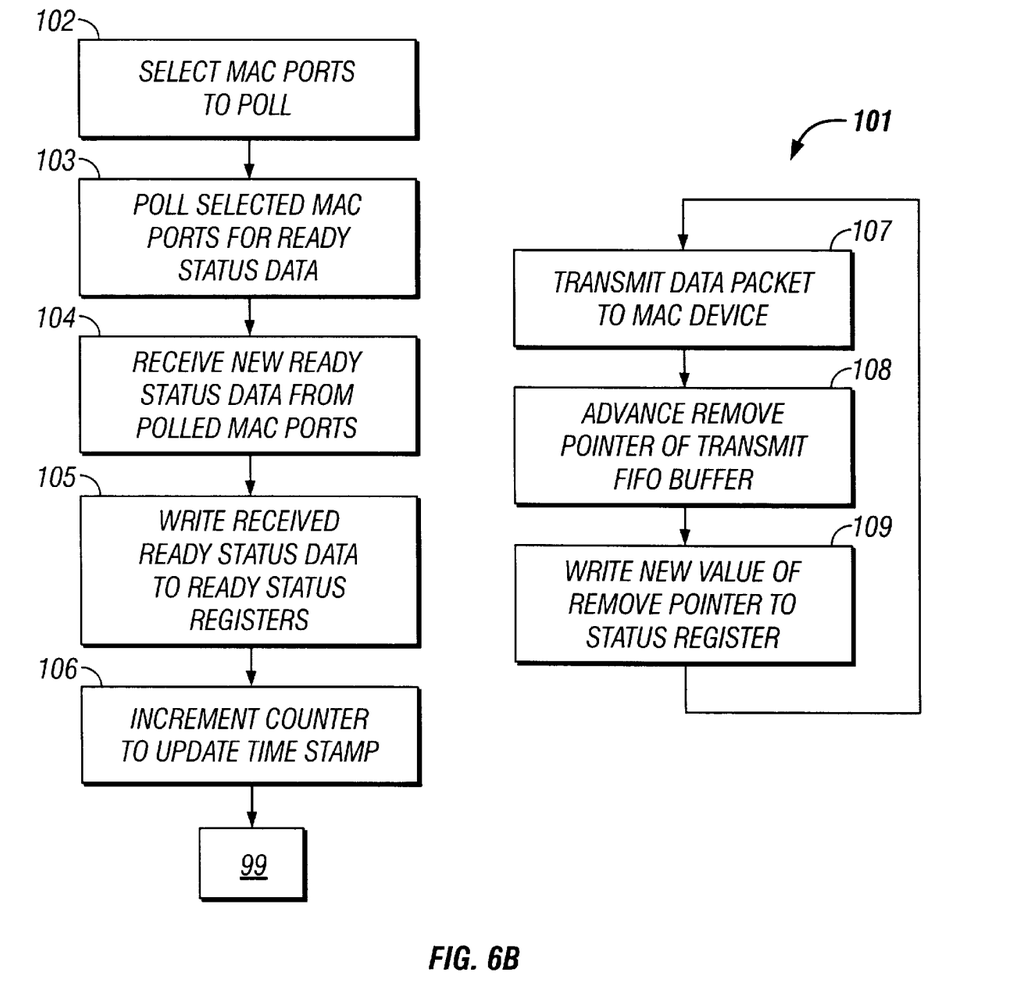
FIG. 6B is a flow chart showing a processor for collecting ready-status data.

Referring to FIG. 6B, a process 101 by which the FBI 38 collects ready status data is shown. Separate collection cycles are performed to collect receive-ready status data and to collect transmit-ready status data. Each collection cycle also initiates an unsolicited transfer of at least a portion of the collected ready status data to the processing engines 22a–22f.

To start a new collection cycle, the control module 50 for the ready bus 42 selects 102 the addresses to be polled for ready status data. The selection may be for all addresses of the MAC ports 28, 30, 32 connected to the FIFO bus 16 or for a sub-range of the addresses. If a sub-range is selected, the collection of new ready status data spans several cycles, a portion of the MAC ports 28, 30, 32 being polled in each cycle. The sub-range polled in collection cycles may be programmed into the processor core 44 or the FBI 38.

The control module 50 polls 103 by sending status queries over the ready bus 42 to the selected ports 28, 30, 32 of the MAC devices 14, 14', 14". In response to the queries, the control module 50 receives 104 new ready status data from the polled ports 28, 30, 32. A response to a query for receive-ready status data indicates whether the responding port 28, 30, 32 has a data packet ready to transmit. A response to a query for transmit-ready status indicates whether the responding port 28, 30, 32 has space available to receive another data packet.

The control module 50 writes 104 new ready status data, which has been from the responses, to the status registers $R_1$, $R_2$, $R_4$, $R_5$, shown in FIGS. 5A–5B. The control module 50 also increments 120 the counter value in status register $R_3$. Incrementing the counter value updates the time stamp associated with the newly collected ready status data. After updating the time stamp, the FBI 38 performs an unsolicited transfer 99 of the newly collected ready status data to the scheduler threads located in processing engines 22a–22f.

The FBI 38 transmits 107 data packets from the transmit FIFO buffer 60 asynchronously with respect to the collection of ready status data from the MAC devices 14, 14', 14". In response to each transmission, the FBI 38 advances 108 the remove pointer 96 of the transmit FIFO buffer 60 and writes 110 the new position of the remove pointer 96 to status register $R_6$. The number stored in the status register $R_6$ reflects. the present position of the remove pointer 96 of the transmit FIFO buffer 60.

Figure 7A:
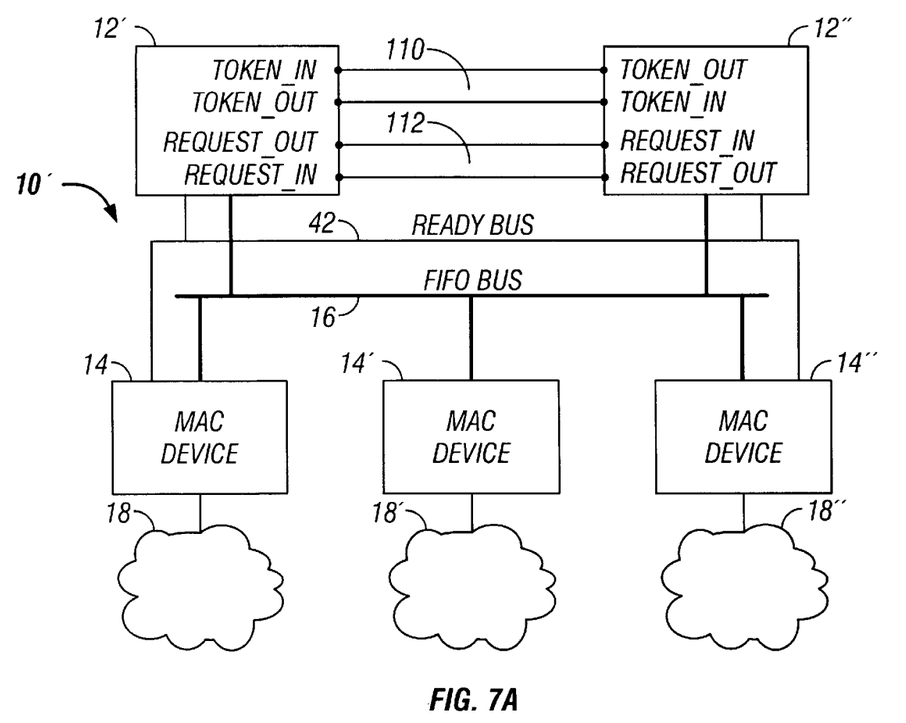
FIG. 7A is a block diagram of a router with two processors that temporally share control of the FIFO bus.

Referring to FIG. 7A, another router 10' for transmitting data packets among the networks 18, 18', 18" is shown. The router 10', includes two multi-threaded processors 12', 12". Each processor 12', 12" couples to the MAC devices 14, 14', 14" via the FIFO bus 16 and the ready bus 42. Each processor 12', 12" has components and performs functionalities already described in FIGS. 1–3 and 5A–6 for the processor 12.

The processors 12', 12" temporally share processing of the data packets transmitted by the MAC devices 14, 14', 14".

Each processor 12', 12" routes data packets received from an assigned subset of the MAC ports 28, 30, 32. In one embodiment, the processor 12' routes data packets received from the least significant 16 MAC port addresses, and the other processor 12" routes data packets received from the most significant 16 MAC port addresses. Both processors 12', 12" can retransmit received data packets to any MAC port 28, 30, 32. By sharing the duty of routing incoming data packets between the two processors 12', 12", the router 10' can handle a higher incoming packet rate.

The processors 12', 12" temporally share control of the FIFO bus 16. At each instant, one of the processors 12', 12" controls the FIFO bus 16 as a bus-master, and the remaining processor 12', 12" is a bus-slave. The bus-master can transmit and receive data packets on the FIFO bus 16. The bus-slave can request bus-master status from the bus-master.

The processor 12' controls communications over the ready bus 42. These communications include ready status requests made by the processor 12' as described in FIG. 6. The ready status requests individually poll MAC devices 14, 14', 14" for receive-ready and transmit-ready status data. The other processor 12" monitors the polling requests. The communications also include responses to polling requests from the MAC devices 14, 14', 14". Both processors 12', 12" monitor the responses over the ready bus 42 capturing ready status data for use in scheduling data transfers. The communications also include information exchanges between the processors 12, 12'. The ready bus 42 enables the processors 121', 12" to exchange scheduling information so that both processors 12', 12" don't schedule data transmissions to the same ready MAC port 28, 30, 32.

The master of the FIFO bus 16 owns a bus-status token. At startup or boot up, the token is owned by the processor 12', which is the initial bus-master. The processor 12" is the initial bus-slave. After startup, the processors 12', 12" can change their designations as master and slave of the FIFO bus 16 by exchanging the bus-status token. The processors change their master-slave designations to process ready data transfers with the MAC devices 14, 14', 14".

The master and slave designations result from arbitration between the processors 12', 12". To establish and change master and slave designations, the processors 12', 12" send voltage signals over lines 110, 112.

The lines 110 connect token_in terminals on each processor 12', 12" to token_out terminals on the other processor 12", 12'. The token_out terminals produce voltage signal indicative of the associated processor's 12', 12" designation as the bus-master or bus-slave. The token_out terminal produces a preselected high voltage if the associated processor 12', 12" is the bus-master and produces a preselected low voltage if the associated processor 12', 12" is the bus-slave.

Figure 7B:
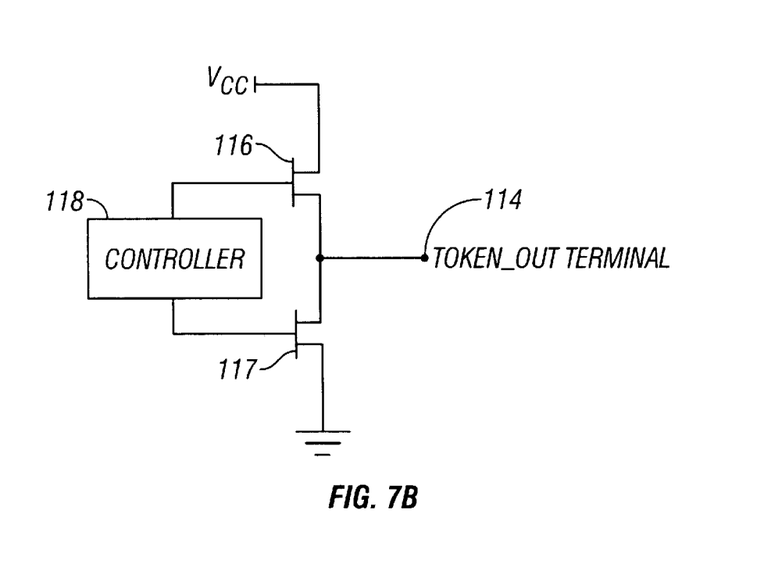
FIG. 7B is block a diagram showing a transistor pair that controls a token_out terminal.

Referring to FIG. 7B, each token_out terminal 114, is controlled by an associated pair of pull-up and pull-down transistors 116, 117. At startup, a controller 118 biases the pull-up transistor 116 of the processor 12' to drive the associated token_out terminal to the high preselected voltage $V_{cc}$. At start up, the controller 118 of the other processor 12" biases the pull-down transistor 117 to drive the associated token_out terminal to the low voltage, i.e., ground. After startup, the biasing of the pull-up and pull-down resistors 116, 117 connected to the token_out terminals alternates to transfer token ownership.

The lines 112 connects a request_out terminal of each processor 12', 12" to a request_in terminal of the other processor 12", 12'. A processor 12', 12" drives its request_out terminal at the high preselected voltage to request the bus-master token from the other processor 12", 12'. The other processor 12', 12" detects requests from the value of the electrical potential at its request_in terminal. Measuring the low preselected voltage at the request_in terminal indicates that no request for the bus-master token has been made.

Figure 8:
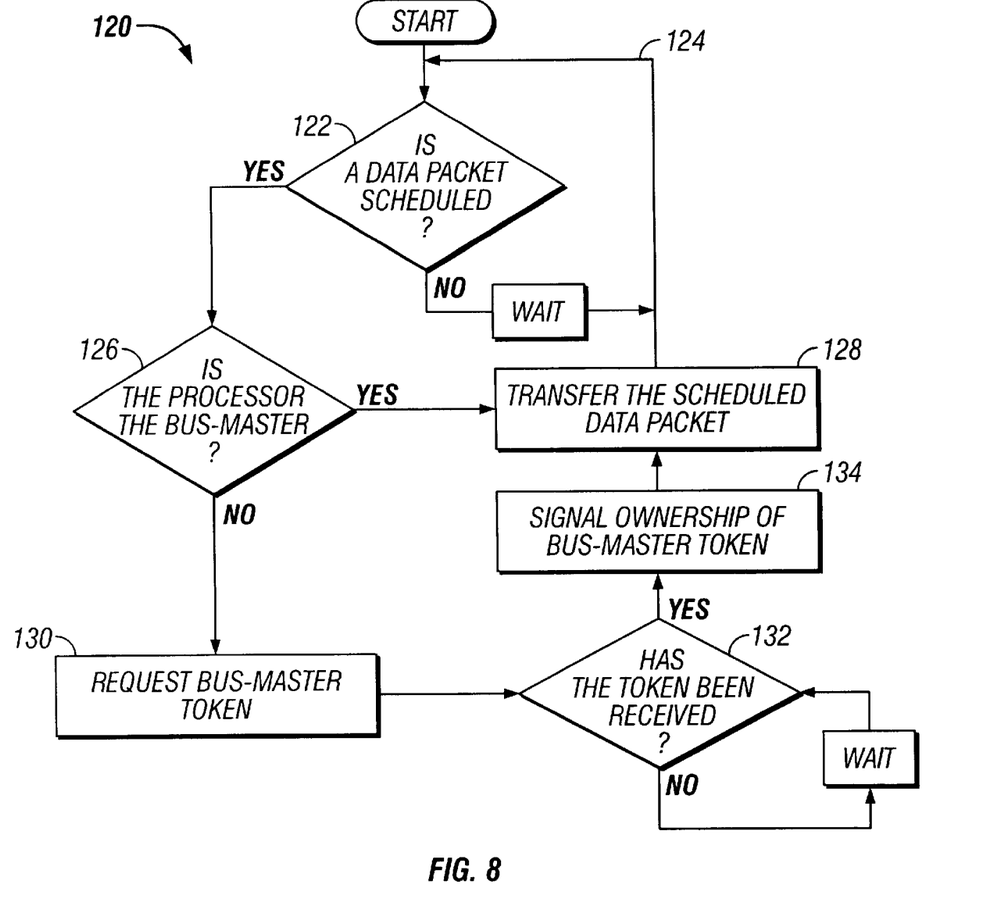
FIG. 8 is a flow chart showing a process for transferring data packets over the FIFO bus.

Referring to FIG. 8, a process 120 to perform scheduled data transfers with the MAC devices 14, 14', 14" is shown. To start a processing cycle, the processor 12' determines 122 whether a data transfer is scheduled. The determination includes reading the receive and transmit FIFO buffers 58, 60 and finding that there is a scheduled transfer if either buffer 58, 60 has a valid entry. If no data transfer is scheduled, the processor 12' waits a preselected time and loops back 124 to re-determine 122 whether a scheduled data transfer is present.

If the processor 12' determines that a data transfer is scheduled, the processor 12' checks 126 whether it is the designated master of the FIFO bus 16. To check its designation, the processor 12' can sample the voltage produced by its token_out terminal. If the voltage has the high value $V_{cc}$, the processor 12', 12" is the master. If it determines that it is the master, the processor 12' transfers 128 the scheduled data packet. The transfer may involve either transmitting a data packet to a destination MAC port 28, 30, 32 or receiving a data packet from a source MAC port 28, 30, 32. After making the scheduled data transfer, the processor 12', 12" loops back 124 and determines 122 whether new data transfers are scheduled.

In response to determining that it is not the bus-master, the processor 12' requests 130 the bus-master token from the other processor 12". To make the request, the processor 12' drives its request_out terminal to the high voltage $V_{cc}$. In response to the high voltage $V_{cc}$ at its request_in terminal, the other processor 12" determines that a request for the token has been made.

After requesting the token, the requesting processor 12' monitors 132 for transfer of ownership of the bus-master token by the other processor 12". The processor 12' detects a transfer from the value of the voltage at its token_in terminal. At transfer of the token, the voltage at the token_in terminal changes from the high voltage $V_{cc}$ to a preselected low voltage, e.g., ground voltage. After detecting a transfer, the processor 12' signals 134 ownership of the token by pulling-up its token_out terminal to the high voltage $V_{cc}$. After pulling up the token_out terminal, the processor transfers 128 the scheduled data packet and loops back 124 to determine whether other data transfers are scheduled.

Processor 12" of FIG. 7A also uses the process 120 of FIG. 8 to perform data transfers with the MAC devices 14, 14', 14".

Figure 9:
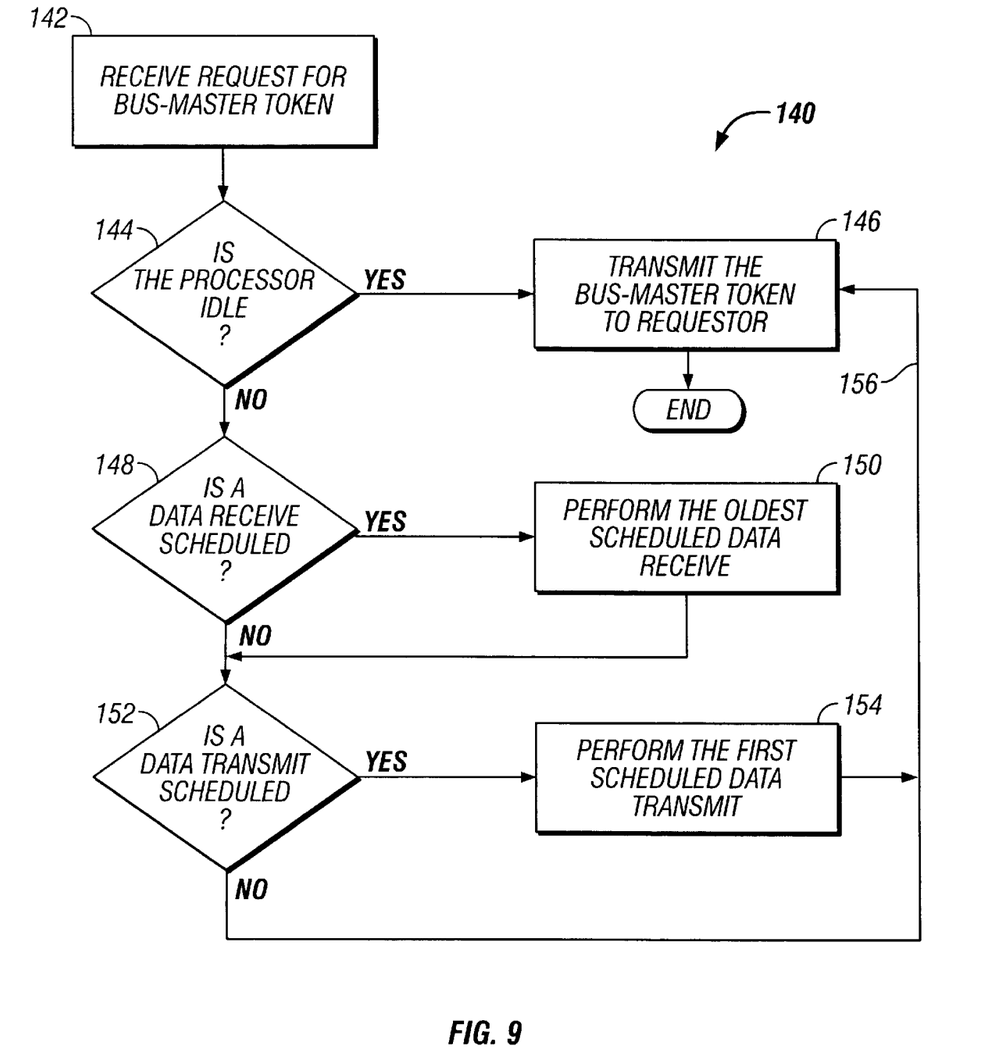
FIG. 9 is a flow chart showing a process for responding to requests for a bus-master token.

Referring to FIG. 9, a process 140 for responding to a request for the bus-master token is shown. The request is directed to the bus master, which can be either processor 12'or 12". The bus-master detects 142 a request for the token from the slave processor by sampling the electric potential at its request_in terminal. If the potential goes from the low ground value to the high voltage $V_{cc}$, the master processor detects a request.

In response to detecting a token request, the bus-master determines 144 whether the FBI 38 is idle. The FBI 38 is idle if no scheduled data transfers are stored in either FIFO buffer 58, 60. If the FBI 38 is idle, the bus-master transmits the token to the requesting processor and becomes the bus-slave. To transmit the token, the master processor pulls down its token_out terminal to the low ground voltage. If the FBI 38 is not idle, the bus-master determines 148 whether a command for receiving a data packet is scheduled. If a receive command is scheduled, the bus-emaster performs 150 the oldest among the scheduled receive commands obtaining the associated data packet from a source MAC port 28, 30, 32.

After performing the oldest of any scheduled receive commands, the bus-master determines 152 whether any commands for transmitting data packets are scheduled. If a transmit command is scheduled, the master processor performs 154 the oldest of the scheduled transmit commands. After performing the oldest transmit command, the bus-master loops back 156 and transmits 146 the bus-master token to the bus-slave. In response to transmitting the token, the bus-master and bus-slave switch roles as described above.

Figure 10:
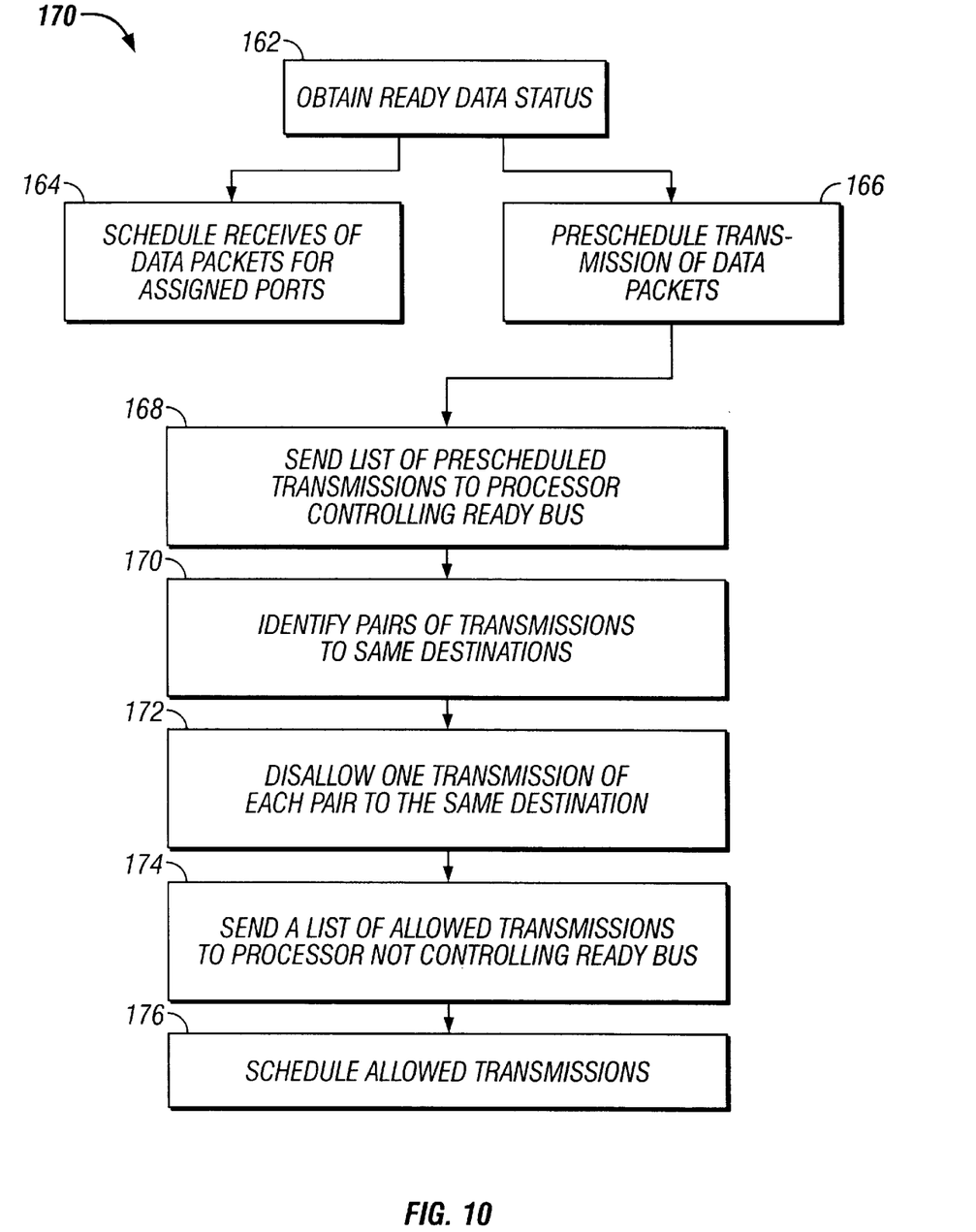
FIG. 10 is a flow chart showing a process for scheduling data transfers with the MAC devices.

Referring to FIG. 10, a process 160 by which the processors 12', 12" schedule data transfers is shown. The processor 12', which controls the ready bus 42, transmits polling requests the MAC ports 28, 30, 32. Both processors 12', 12" obtain 162 ready status data from the ready bus 42. From the ready status data, both processors 12' and 12" schedule 164 receives of data packets from the assigned MAC ports 28, 30, 32. Both processors do not schedule receives from the same MAC port 28, 30, 32, because each MAC port 28, 30, 32 is assigned to only one of the processors 12', 12".

The processors 12' and 12" also use the ready status data to preschedule 166 transmissions of data packets using the ready status data. The prescheduled transmissions can conflict, because both processors 12', 12" can preschedule a transmission to the same ready port. The processor 12" sends 168 a list of its prescheduled transmissions to the processor 12' controlling the ready bus 42.

Using the list, the processor 12' identifies 170 pairs of transmissions from the two processors 12', 12" that have the same destination ports. The processor 12' removes conflicts by disallowing 172 one member of each pair of transmissions to the same destination port. The processor 12' sends 174 a list of allowed transmissions to the other processor 12" via the ready bus 42. Each processor 12', 12" schedules 176 it's allowed transmissions of data packets.

While various embodiments have been described in the detailed description, the description is intended to illustrate and not to limit the scope of the invention, which is defined by the appended claims. Other aspects, advantages, and modifications are within the scope of the claims.

What is claimed is:

1. A router comprising:
a communications bus;
a second bus to transfer ready status data from ports connected to the communications bus; and
at least two processors connected to the communications and second busses, one of the processors to control of the communications bus at any time, each processor to transfer control of the communications bus to another of the processors in response to receiving a request for control from the other of the processors, each port being assignable to a corresponding processor of the processors such that a data packet received at one of the ports is processed by the corresponding processor, the corresponding processor to retransmit the received data packet to another of the ports.

2. The router of claim 1, wherein each processor can transmit and receive a token, one of the processors transmitting the token to a target processor to transfer control of the communications bus to the target processor.

3. The router of claim 2, further comprising:
a plurality of lines; and
wherein each processor has terminals to transmit and receive the token, one of the lines connecting the terminal to transmit the token of one of the processors to the terminal to receive the token of another of the processors.

4. The router of claim 3, wherein each processor further comprises terminals to transmit and receive requests for the token.

5. The router of claim 2, further comprising:
a plurality of devices connected to the communications and second busses, each device capable of transmitting data between an associated network and the communications bus.

6. The router of claim 5, wherein a preselected one of the processors can poll the devices for ready status data.

7. The router of claim 6, wherein the other processor monitors the second bus for ready status data.

8. The router of claim 6, wherein the first and second processors process data packets received from first and second groups of the devices, the first and second groups not having common members.

9. A method of sharing control of a communications bus, comprising:
determining whether a first processor is a master of the communications bus;
requesting that a second processor designate the first processor to be the master of the communications bus in response to the second processor being the master; and
transferring a data packet between the first processor and the communications bus in response to the first processor being designated to be the master.

10. The method of claim 9, further comprising:
transferring a data packet between the first processor and the communications bus in response to determining that the first processor is the master.

11. The method of claim 9, further comprising:
sending a token from the second processor to the first processor in response to the requesting, the sending designating the first processor to be the master.

12. The method of claim 9, wherein the requesting includes driving a request input terminal of the second processor with a preselected voltage associated with a request for the designation of the master.

13. The method of claim 9, further comprising:
determining whether the first processor has scheduled a data transfer over the communications bus, the requesting being responsive to determining that the first processor has a scheduled data transfer.

14. A method of transferring data, comprising:
receiving at a second processor a request from a first processor, the request being for control of a communications bus;
determining whether a second processor is idle in response to receiving the request; and
transferring control from the second processor to the first processor in response to the second processor being idle.

15. The method of claim 14, wherein the second processor is idle if the second processor does not have scheduled data transfers with devices connected to the communications bus.

16. The method of claim 14, wherein the transferring comprises sending a bus-control token from the second processor from the first processor.

17. The method of claim 15, further comprising:
performing one scheduled data transfer from the second processor over the communications bus in response to the receiving the request from the first processor; and then, transferring the control of the communications bus to the first processor.

* * * * *